(12) United States Patent
Hoerler et al.

(10) Patent No.: US 6,889,278 B1
(45) Date of Patent: May 3, 2005

(54) METHOD AND APPARATUS FOR FAST ACKNOWLEDGEMENT AND EFFICIENT SERVICING OF INTERRUPT SOURCES COUPLED TO HIGH LATENCY PATHS

(75) Inventors: Johannes Markus Hoerler, Cary, NC (US); Francis W. Sweet, Jr., Apex, NC (US); Joseph Turner, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 423 days.

(21) Appl. No.: 09/826,271

(22) Filed: Apr. 4, 2001

(51) Int. Cl.[7] ............................................... G08F 13/24
(52) U.S. Cl. ...................... 710/266; 710/266; 710/267; 710/261
(58) Field of Search ................................ 710/260, 261, 710/266, 267, 263, 22, 48, 262, 269; 709/231; 712/29

(56) References Cited

U.S. PATENT DOCUMENTS

| | | | | |
|---|---|---|---|---|
| 4,797,853 A | * | 1/1989 | Savage et al. ................ | 710/22 |
| 4,989,113 A | * | 1/1991 | Asal ............................ | 710/22 |
| 5,475,858 A | * | 12/1995 | Gupta et al. .................. | 712/29 |
| 5,530,874 A | * | 6/1996 | Emery et al. ................. | 710/262 |
| 5,535,420 A | * | 7/1996 | Kardach et al. .............. | 710/48 |
| 5,682,483 A | * | 10/1997 | Wu et al. ..................... | 710/300 |
| 5,754,884 A | * | 5/1998 | Swanstrom .................. | 710/22 |
| 5,819,096 A | * | 10/1998 | Nelson et al. ................ | 710/260 |
| 5,983,275 A | * | 11/1999 | Ecclesine .................... | 709/231 |
| 6,006,301 A | * | 12/1999 | Tetrick ........................ | 710/260 |
| 6,163,829 A | * | 12/2000 | Greim et al. ................. | 710/260 |
| 6,185,652 B1 | * | 2/2001 | Shek et al. ................... | 710/263 |
| 6,205,509 B1 | * | 3/2001 | Platko et al. ................. | 710/269 |
| 6,209,054 B1 | | 3/2001 | Lee | |
| 6,247,091 B1 | * | 6/2001 | Lovett ......................... | 710/260 |
| 6,256,699 B1 | | 7/2001 | Lee | |
| 6,418,494 B1 | * | 7/2002 | Shatas et al. ................ | 710/305 |
| 6,442,634 B2 | * | 8/2002 | Bronson et al. ............. | 710/260 |
| 6,466,998 B1 | * | 10/2002 | Bennett ....................... | 710/48 |
| 6,606,677 B1 | * | 8/2003 | Okbay et al. ................ | 710/262 |

OTHER PUBLICATIONS

U.S. Appl. No. 09/791,063, Rachepalli et al.

* cited by examiner

*Primary Examiner*—Tim Vo
*Assistant Examiner*—Justin King
(74) *Attorney, Agent, or Firm*—Cesari and McKenna, LLP

(57) ABSTRACT

A system and technique provides fast acknowledgement and servicing of interrupt sources coupled to a high latency path of an intermediate node of a computer network. An external device coupled to the high latency path is provided with a separate interrupt signal for each type of interrupt supported by a processor of the intermediate node. Each interrupt signal is directly fed to an interrupt multiplexing device over a first low latency path. The multiplexing device is accessible to the processor through a second low latency path. The external device asserts an interrupt by "pulsing" an appropriate interrupt signal to the multiplexing device. The multiplexing device maintains a current counter for each interrupt signal and increments that counter every time an interrupt pulse is detected. In addition to the counter, the multiplexing device maintains a status bit for each interrupt.

34 Claims, 7 Drawing Sheets

METHOD AND APPARATUS FOR FAST ACKNOWLEDGEMENT AND EFFICIENT SERVICING OF INTERRUPT SOURCES COUPLED TO HIGH LATENCY PATHS

FIELD OF THE INVENTION

The present invention relates to nodes of a computer network and, in particular, to an efficient interrupt system of an intermediate node, such as an aggregation router, used in a computer network.

BACKGROUND OF THE INVENTION

A computer network is a geographically distributed collection of interconnected communication links and segments for transporting data between nodes, such as computers. Many types of network segments are available, with the types ranging from local area networks (LAN) to wide area networks (WAN). For example, the LAN may typically connect personal computers and workstations over dedicated, private communications links, whereas the WAN may connect large numbers of nodes over long-distance communications links, such as common carrier telephone lines. The Internet is an example of a WAN that connects disparate networks throughout the world, providing global communication between nodes on various networks. The nodes typically communicate over the network by exchanging discrete frames or packets of data according to predefined protocols. In this context, a protocol consists of a set of rules defining how the nodes interact with each other.

Computer networks may be further interconnected by an intermediate node, such as a switch or router, having a plurality of ports that may be coupled to the networks. To interconnect dispersed computer networks and/or provide Internet connectivity, many organizations rely on the infrastructure and facilities of Internet Service Providers (ISPs). ISPs typically own one or more backbone networks that are configured to provide high-speed connection to the Internet. To interconnect private networks that are geographically diverse, an organization may subscribe to one or more ISPs and couple each of its private networks to the ISP's equipment. Here, the router may be utilized to interconnect a plurality of private networks or subscribers to an IP "backbone" network. Routers typically operate at the network layer of a communications protocol stack, such as the internetwork layer of the Transmission Control Protocol/Internet Protocol (TCP/IP) communications architecture.

Simple networks may be constructed using general-purpose routers interconnected by links owned or leased by ISPs. As networks become more complex with greater numbers of elements, additional structure may be required. In a complex network, structure can be imposed on routers by assigning specific jobs to particular routers. A common approach for ISP networks is to divide assignments among access routers and backbone routers. An access router provides individual subscribers access to the network by way of large numbers of relatively low-speed ports connected to the subscribers. Backbone routers, on the other hand, provide transports to Internet backbones and are configured to provide high forwarding rates on fast interfaces. ISPs may impose further physical structure on their networks by organizing them into points of presence (POP). An ISP network usually consists of a number of POPs, each of which comprises a physical location wherein a set of access and backbone routers is located.

As Internet traffic increases, the demand for access routers to handle increased density and backbone routers to handle greater throughput becomes more important. In this context, increased density denotes a greater number of subscriber ports that can be terminated on a single router. Such requirements can be met most efficiently with platforms designed for specific applications. An example of such a specifically designed platform is an aggregation router. The aggregation router is an access router configured to provide high quality of service and guaranteed bandwidth for both data and voice traffic destined for the Internet. The aggregation router also provides a high degree of security for such traffic. These functions are considered "high-touch" features that necessitate substantial processing of the traffic by the router. Notably, the aggregation router is configured to accommodate increased density by aggregating a large number of leased lines from ISP subscribers onto a few trunk lines coupled to an Internet backbone.

When designing an intermediate node, such as an aggregation router, it may be necessary to place an external device controlling an interrupt source behind a shared bus or other path having high latency on data transfers. However, this architecture may lead to long delays in accessing that external device when acknowledging the interrupt. As an example, consider an aggregation router comprising a central processing unit (CPU) and CPU memory coupled to an external bus, such as a conventional peripheral computer interconnect (PCI) bus, via a system controller. An external device, such as a direct memory access (DMA) controller, is coupled to the PCI bus via a PCI bridge. Since the PCI bus is shared among the DMA controller, the PCI bridge and the system controller, each device must arbitrate for access to the bus prior to transferring data over the bus. As a result, the PCI bus is a slow, high latency path.

The DMA controller performs DMA operations to and from the CPU memory over the PCI bus. That is, the DMA controller moves data, such as packets, over the PCI bus and bridge, through the system controller and to memory for processing by the CPU. In addition, the controller moves packets from the CPU memory through the system controller over the PCI bus and bridge to destinations within the router. The DMA controller notifies the CPU of completion of these DMA operations through the use of an interrupt signal. Although the CPU is notified of an interrupt, it requires further information to determine the type and source of the interrupt.

The CPU typically obtains such further information by retrieving the contents of a register within the DMA controller. For example, the CPU may retrieve the contents of an interrupt status register (ISR) which stores information (e.g., a status bit) identifying the type and source of the interrupt. Each source that asserts an interrupt has a corresponding asserted status bit within the ISR. Depending upon the type of interrupt and the particular source(s) generating the interrupt, appropriate interrupt handler code is invoked by the CPU to service the interrupt. The handler may then examine a data structure in the CPU memory that is shared between the CPU and DMA controller in order to access the data associated with the interrupt.

The shared data structure typically has a plurality of control blocks that point to (references) buffers in the memory where data, e.g., packets, associated with the interrupt reside. Each control block includes an ownership bit denoting ownership of the control structure by the DMA controller or the CPU. When it has a packet to move into CPU memory, the DMA controller examines the state of the ownership bit to determine whether it is the owner of that control block. If it is, the DMA controller moves the data packet into the buffer specified by the control block. After the data transfer is completed, the DMA controller changes the state of the ownership bit to reflect ownership of the control block by the CPU. The DMA controller then issues the interrupt signal to the CPU which, subsequently, enters the interrupt handler to search the shared data structure for a control block indicating ownership by the CPU.

Specifically, the DMA controller performs a write operation over the PCI bus to move the packet into a CPU memory buffer referenced by the control block and then performs another write operation to change the state of the ownership bit for that control block. After issuing the change of ownership operation over the PCI bus, the DMA controller generates and asserts the interrupt signal. Yet when the CPU/handler accesses its memory in response to the interrupt, it is possible that the data packet has not yet been written (stored) at the appropriate memory location. Moreover, the data packet may be stored at the appropriate memory location, but the ownership bit may not yet have been updated by the change of ownership operation because it is "stalled" within buffers or queues of the devices coupled to the PCI bus.

When the CPU issues a read operation to retrieve the contents of the ISR within the DMA controller to determine the type of interrupt, that read operation also functions to ensure that any pending write operations from the DMA controller to the CPU memory have been "flushed" from those queues. That is, the read operation that informs the CPU as to the type of interrupt generated by the DMA controller also ensures that the data packet and ownership bit transfers have been completed to the CPU memory. In addition, the read operation acknowledges and clears the interrupt at the DMA controller. Thus, the CPU acknowledges and clears the interrupt by retrieving the contents of the ISR in the DMA controller. However, the read operation generally takes a long time to complete because devices coupled to the PCI bus, such as the PCI bridge, need to arbitrate for the shared bus. The present invention is directed to reducing the time it takes to acknowledge and clear the interrupt and, in essence, reducing the latency caused by a read operation over a slow bus of the router.

SUMMARY OF THE INVENTION

The present invention relates to a system and technique configured to provide fast acknowledgement and efficient servicing of interrupt sources coupled to a shared bus or other high latency path of an intermediate node of a computer network. The interrupt acknowledgement system avoids device accesses over the high latency path to thereby enable more efficient and faster acknowledgement of the interrupt sources. An external device coupled to the high latency path is provided with a separate interrupt signal for each type of interrupt supported by a processor of the intermediate node, such as an aggregation router. Each interrupt signal is directly fed to an interrupt multiplexing device over a first low latency path. The multiplexing device is accessible to the processor through a second low latency path, e.g., a fast device bus directly connected to the device.

The external device asserts an interrupt by "pulsing" an appropriate interrupt signal to the multiplexing device. The interrupt multiplexing device maintains a current counter for each interrupt signal and increments that counter every time an interrupt pulse is detected. The counter "wraps" to an initialized value whenever it reaches its maximum value. In addition to the counter, the multiplexing device maintains a status bit for each interrupt that is set whenever an interrupt is asserted, i.e., whenever the counter is incremented. The status bit is then cleared in response to accessing (i.e., "reading") of the bit when determining its state.

According to the present invention, software, e.g., an interrupt handler, executing on the processor implements the following sequence when servicing interrupts asserted by the external device. On system reset or start up, the interrupt handler initializes a counter variable internal to the processor, i.e., the last counter, to a predetermined value, such as zero. In response to a particular interrupt signal asserted by the external device, the interrupt handler (i) reads the status bit (which clears that bit) and (ii) if the status bit is clear, exits the sequence.

If the status bit is set, the interrupt handler (iii) reads the value of the current counter and (iv) compares that current counter value with the value of the last counter. If the last counter value is greater than or equal to the current counter value, taking counter wraps into consideration, then the sequence returns to (i) where the handler reads the status bit and proceeds accordingly. If not, the interrupt handler (v) checks a next control block shared between the processor and the external device, and (vi) determines whether the processor owns the control block. That is, an ownership bit of the control block is examined to determine whether the processor owns the block.

If the processor does not own the control block, the sequence returns to (iv) where the handler compares the value of the current counter with the value of the last counter and proceeds accordingly. If the processor owns the control block, the interrupt handler processes the block and then increments the last counter for the processed control block, i.e., interrupt. The handler then determines whether a preset limit for processing control blocks has been reached. If not, then the sequence returns to (v) where the handler checks the next control block and proceeds accordingly. If the limit is reached, then the handler is dismissed and exits the sequence.

Advantageously, the novel interrupt acknowledgement and servicing technique replaces slow accesses to external devices, such as direct memory access controllers, with substantially the same number of accesses to fast external devices, such as the interrupt multiplexing device, therefore improving the time it takes to execute the interrupt handler.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
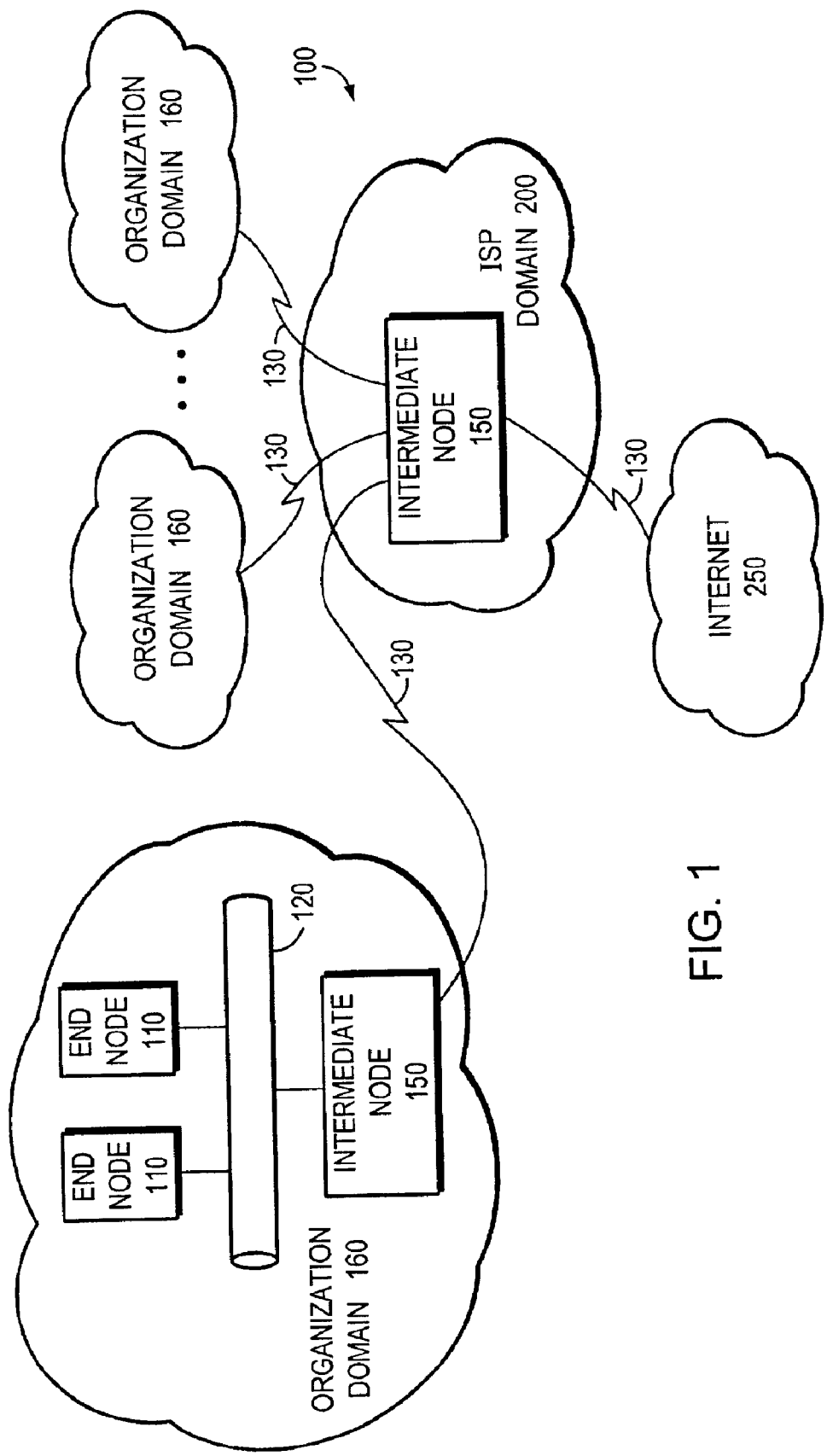
FIG. 1 is a schematic block diagram of a network including a collection of communication links and segments organized into a plurality of subscriber domains coupled to an Internet service provider (ISP) domain.

FIG. 1 is a schematic block diagram of a computer network 100 comprising a collection of communication links and segments connected to a plurality of nodes, such as end nodes 110 and intermediate nodes 150. The network links and segments may comprise local area networks (LANs) 120 and wide area network (WAN) links 130 interconnected by intermediate nodes 150, such as network switches or routers, to form an internetwork of computer nodes. These internetworked nodes communicate by exchanging data packets according to a predefined set of protocols, such as the Transmission Control Protocol/Internet Protocol (TCP/IP). It should be noted that other techniques/protocols, such as the Hypertext Transfer Protocol (HTTP), may be advantageously used with the present invention.

Figure 2:
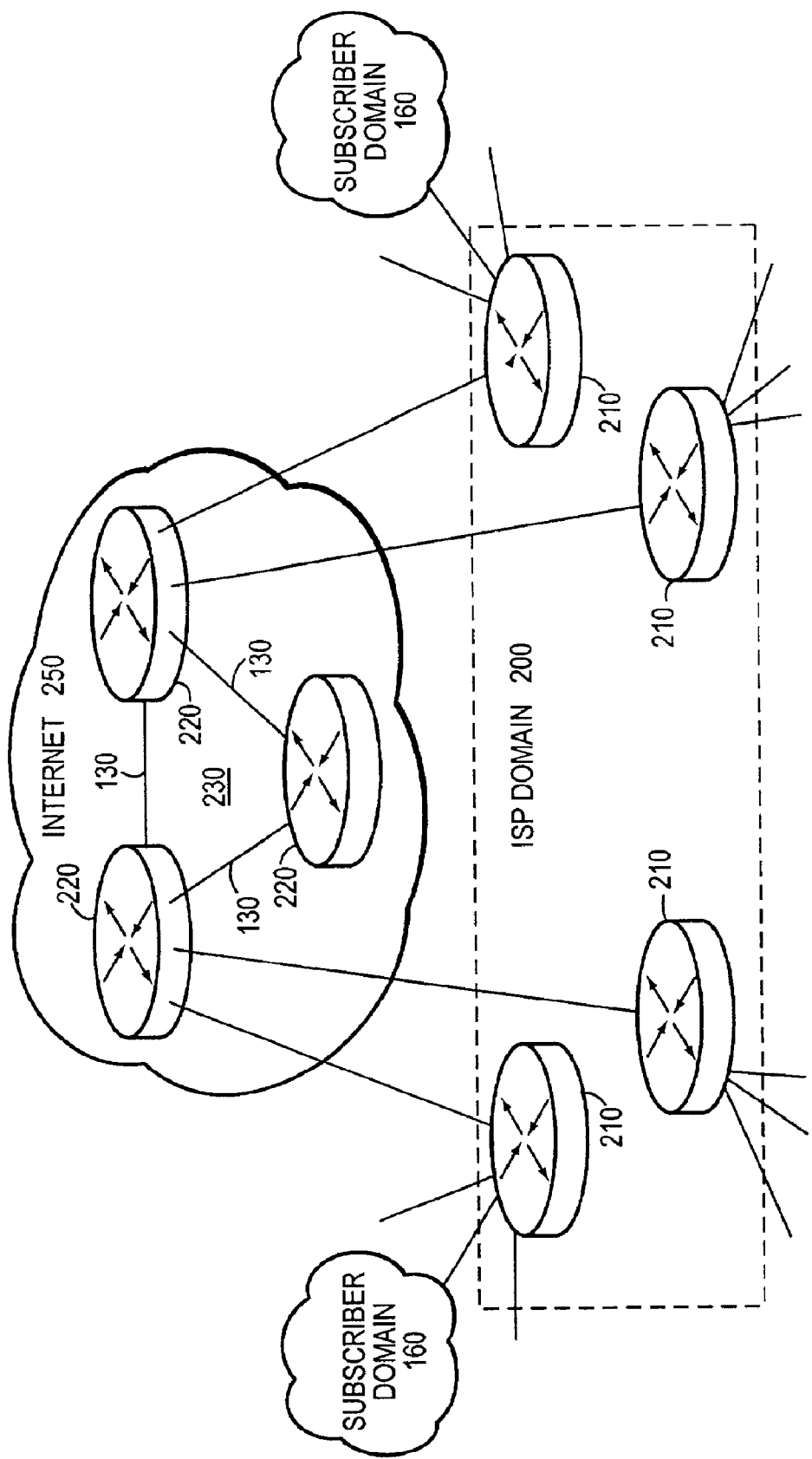
FIG. 2 is a schematic block diagram of an ISP domain comprising a plurality of interconnected access and backbone routers.

To interconnect their dispersed private computer networks and/or provide Internet connectivity, many organizations rely on the infrastructure and facilities of Internet service providers (ISPs) rather than purchase and configure the necessary equipment themselves. In the illustrative embodiment, the computer network 100 is organized into a plurality of domains, including organization domains 160 of private networks coupled to an ISP domain 200. An organization 160 may subscribe to one or more ISPs 200 and couple each of its private networks to the ISP's equipment. FIG. 2 is a schematic block diagram of an ISP domain 200 comprising a plurality of interconnected access and backbone routers 210, 220. The access routers 210 connect the individual organization or subscriber domains 160 to the backbone routers 220 via relatively low-speed ports connected to the subscribers. The backbone routers 220 are interconnected by WAN links 130 to form one or more backbone networks 230 configured to provide high-speed, high-capacity, wide area connectivity to the Internet, represented herein as Internet cloud 250.

Figure 3:
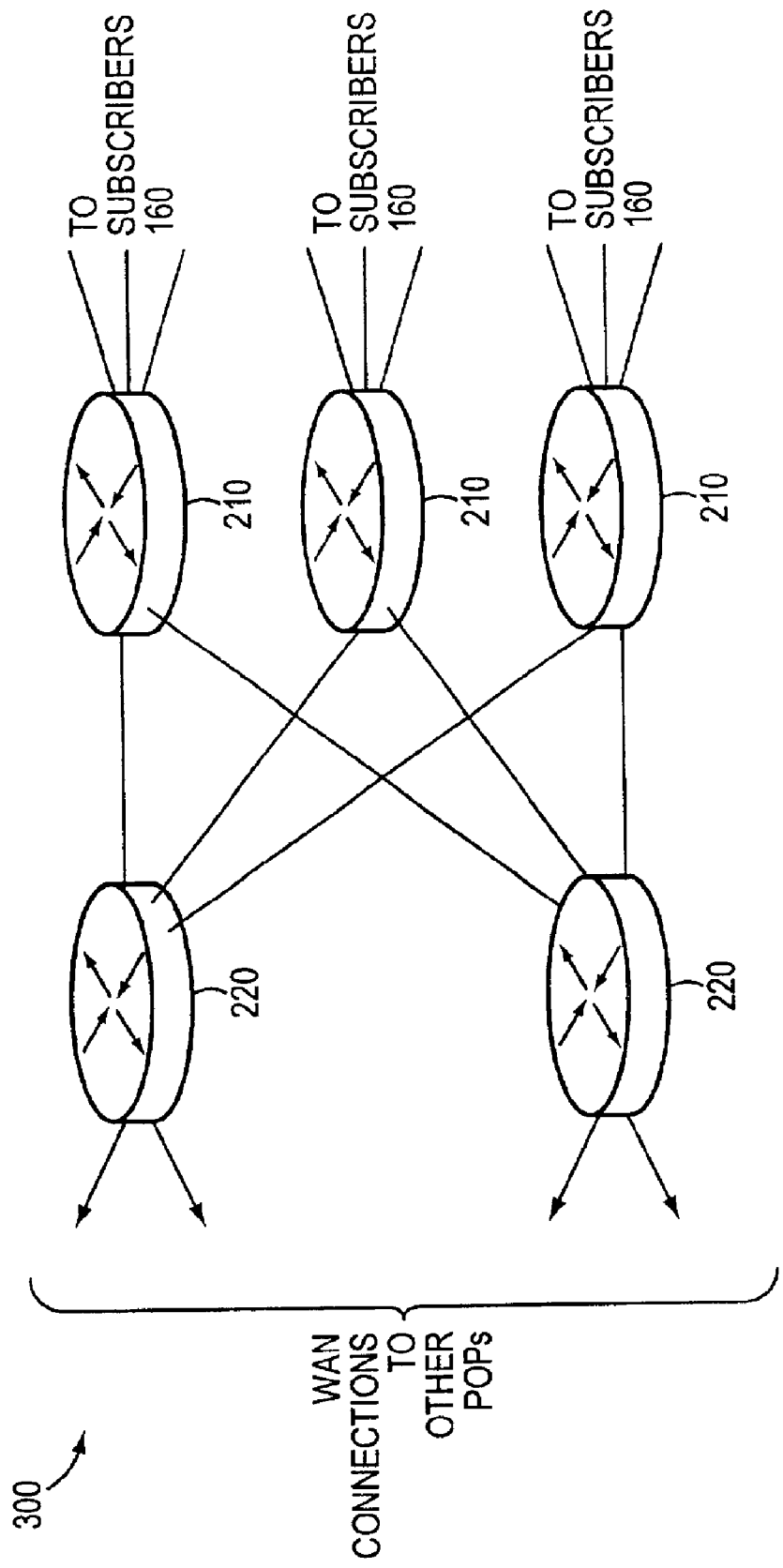
FIG. 3 is a schematic block diagram of an illustrative embodiment of an ISP point of presence (POP) that may be advantageously used with the present invention.

An ISP domain 200 may be further organized into points of presence (POP), each of which comprises a physical location wherein a set of access and backbone routers is located. FIG. 3 is a schematic block diagram of an illustrative embodiment of a POP 300 that may be advantageously used with the present invention. The POP 300 comprises a plurality of backbone routers 220 coupled to access routers 210 equipped with redundant trunk connections. The use of more than one backbone router enhances network availability, as does the use of redundant trunk connections on the access routers. The backbone routers 220 and access routers 210 are maintained separately so that backbone router configuration can be kept relatively stable over time. Backbone routers are not affected when individual subscribers add or remove value-added services or when individual subscribers are added to or removed from the access routers 210. In addition, access routers can be added as new subscribers are brought onto the network.

As Internet traffic increases, the demand for access routers 210 to handle increased density, and backbone routers 220 to handle greater throughput, becomes more important. Increased density denotes a greater number of subscriber ports that can be terminated on a single access router. An aggregation router is an access router configured to accommodate increased density by aggregating a large number of leased lines from ISP subscribers onto a few trunk lines coupled to an Internet backbone. That is, the aggregator essentially functions as a large "fan-in" device wherein a plurality of relatively low-speed subscriber input links is aggregated onto at least one high-speed output trunk to a backbone network of the Internet.

Figure 4:
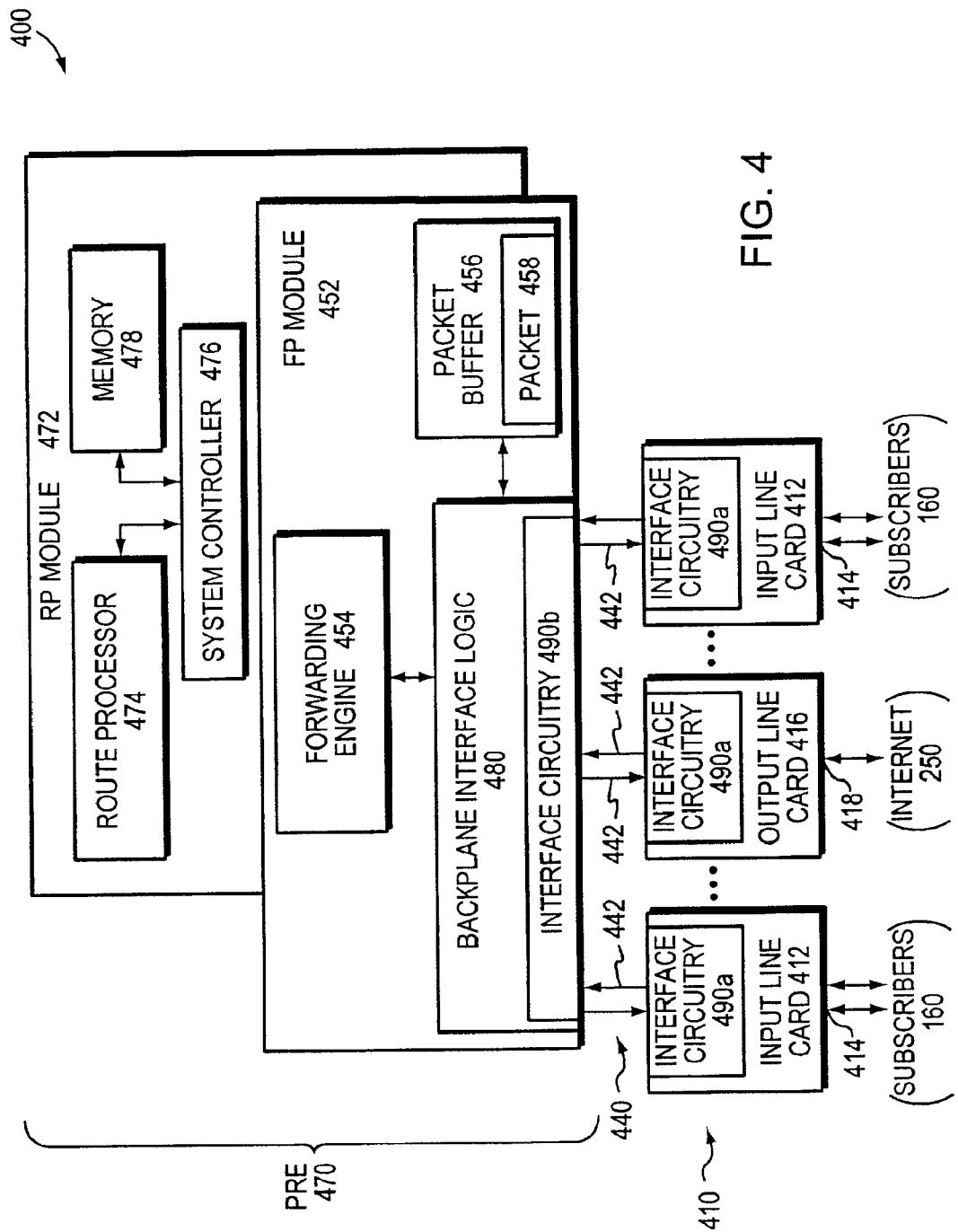
FIG. 4 is a schematic block diagram of an aggregation router that may be advantageously used with the present invention.

FIG. 4 is a schematic block diagram of an aggregation router 400 that may be advantageously used with the present invention. The aggregation router comprises a plurality of line cards 410 coupled to at least one performance routing engine (PRE 470) via a unidirectional (i.e., point-to-point) interconnect system 440. The line cards 410 include a plurality of input cards 412 having input ports 414 coupled to subscribers 160 and at least one output "trunk" card 416 configured to aggregate the subscriber inputs over at least one output port 418. The PRE 470 is an assembly comprising a fast packet "forwarding" processor (FP) module 452 and a route processor (RP) module 472 adapted to perform packet forwarding and routing operations, respectively. The FP and RP modules are preferably interconnected in a "mezzanine" arrangement to form the PRE 470. The PRE assembly also provides quality of service functions for complete packets received from each input line card over the interconnect system. To that end, the interconnect system 440 comprises a plurality of high-speed unidirectional links 442 coupling the PRE to each line card 410.

The RP module 472 is a processor-based, routing system suite comprising functionality incorporated within a typical router. That is, the RP module comprises a general-purpose processor 474 (e.g., a MIPS route processor) coupled to a system controller 476 and memory 478. The memory 478 comprises synchronous dynamic random access memory (SDRAM) storage locations addressable by the processor 474 for storing software programs and data structures accessed by the components. A network routing operating system, portions of which are typically resident in memory and executed by the route processor, functionally organizes the router by, inter alia, invoking network operations in support of software processes executing on the router. The route processor 474 is configured to construct and load routing tables used by the FP module 452. The processor 474 also performs configuration management functions of the aggregation router 400 and communicates with neighboring peer routers to exchange protocol data units used to construct the routing tables in accordance with conventional routing algorithms. It will be apparent to those skilled in the art that other memory means, including various computer readable media, may be used for storing and executing program instructions pertaining to the operation of the router.

The FP module 452 is responsible for rendering forwarding decisions for the aggregation router and, to that end, includes a forwarding engine 454 (such as an arrayed processing engine) coupled to a high-performance backplane interface logic circuit 480. The backplane logic circuit 480 is preferably embodied as a high performance, application specific integrated circuit (ASIC), hereinafter referred to as the Cobalt ASIC, which is configured to further interface the line cards to a packet buffer 456 used to store packets 458 for use by the forwarding engine. An example of a backplane logic circuit that may be advantageously used with the present invention is disclosed in co-pending and commonly-owned U.S. patent application Ser. No. 09/791,063 titled High Performance Interface Logic Architecture of an Intermediate Network Node, which application is hereby incorporated by reference as though fully set forth herein.

Interface circuitry 490 includes interconnect ports coupled to the point-to-point links 442 of the interconnect system 440 and implements a unidirectional, point-to-point clock forwarding technique that is configured for direct ASIC-to-ASIC transmission over a backplane of the aggregation router. As a result, the interface circuitry 490a resident on the line cards 410 is preferably embodied within a high-performance ASIC, hereinafter referred to as the Barium ASIC, whereas the interface circuitry 490b is resident on the Cobalt ASIC. The interface circuitry generally converts conventional formats of data received at the line cards 410 to a protocol format for transmission from, e.g., the Barium ASIC over the interconnect system 440 to the Cobalt ASIC.

Figure 5:
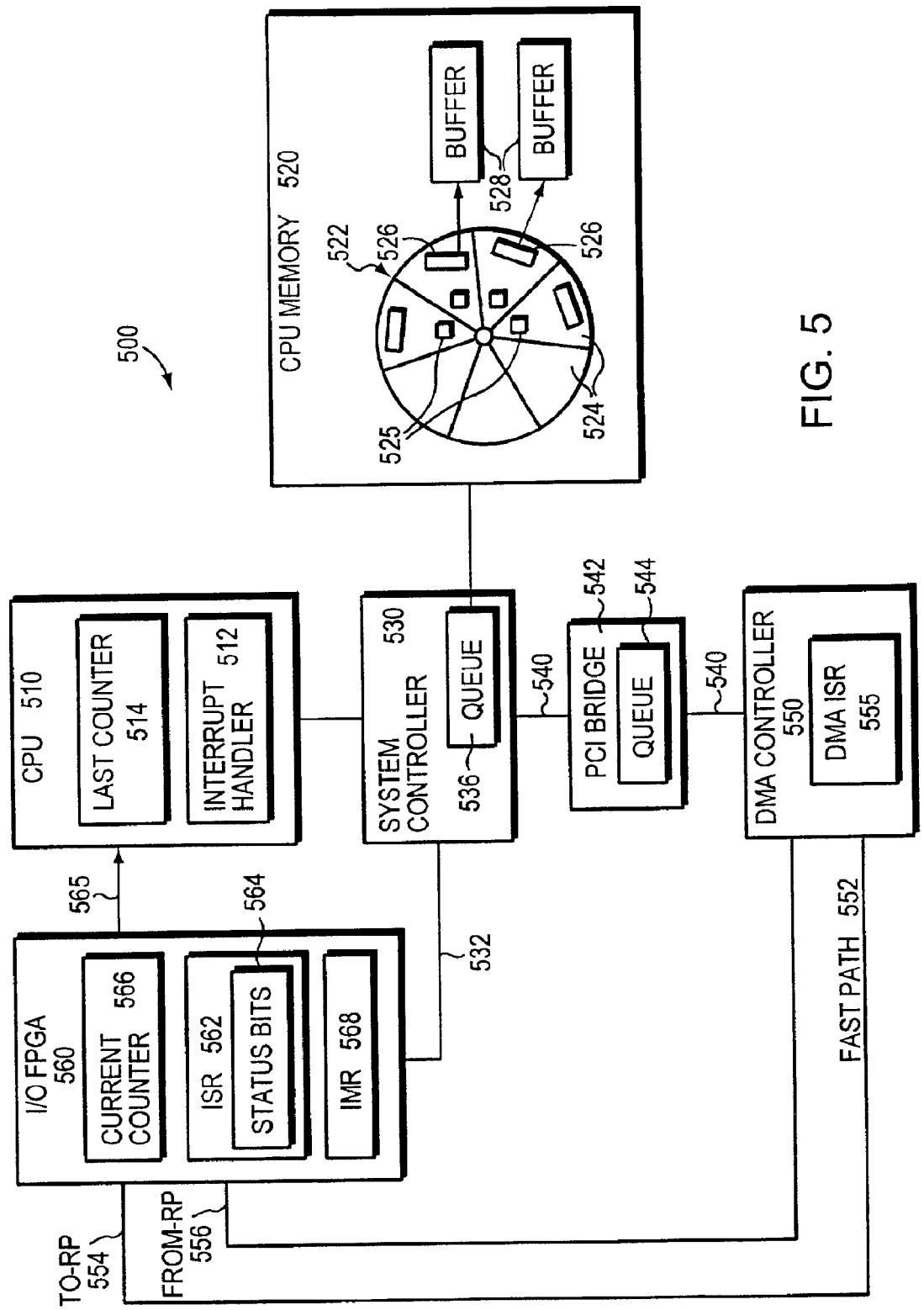
FIG. 5 is a schematic block diagram of an embodiment of the aggregation router, including a direct memory access (DMA) controller, that may be advantageously used with the present invention.

FIG. 5 is a schematic block diagram of an embodiment 500 of the aggregation router that may be advantageously used with the present invention. Here, a central processing unit (CPU) 510 (e.g., router processor 474) is coupled to a CPU memory 520 (e.g., memory 478) via a system controller 530 (e.g., controller 476). The system controller 530 is, in turn, coupled to an external device, such as a conventional direct memory access (DMA) controller 550, via an external high latency bus, such as a conventional peripheral computer interconnect (PCI) bus 540. It should be noted that the system controller could be integrated with the CPU onto a single chip having a PCI interface. In addition, the CPU memory could also be integrated onto a single chip along with the CPU and system controller.

In the illustrative embodiment described herein, the DMA controller 550 resides on the Cobalt ASIC of the FP module 452, whereas the CPU 510, system controller 530 and CPU memory 520 reside on the RP module 472 of the aggregation router. The FP module is coupled to the RP module via the PCI bus 540 and a PCI bridge 542. The PCI bus 540 is a high latency bus primarily because it is shared among a plurality of devices, including the system controller 530, the PCI bridge 542 and the DMA controller 550. The DMA controller 550 is configured to move data, such as packets, over the PCI bus 540 to and from the CPU memory 520 in accordance with DMA operations. For example, data packets 458 that the forwarding engine 454 marks as destined for the CPU 510 are transferred from the DMA controller to the CPU memory 520. Similarly, data packets that the CPU marks as destined for the line cards 410 of the aggregation router are transferred from the CPU memory 520 to the DMA controller 550, which forwards the packets 458 to the forwarding engine 454.

The DMA controller notifies the CPU of completion of the DMA operations through the use of two interrupt signals that are transported over a low latency path 552, e.g., traces on a printed circuit board. A first interrupt signal is a to-RP signal 554 denoting that a packet has been moved by the DMA controller into the CPU memory and is available for processing by the CPU. A second interrupt signal is a from-RP signal 556 denoting that a packet residing in CPU memory has been moved from that memory to the DMA controller. However, the CPU 510 has a predetermined number of interrupt inputs (e.g., five interrupt levels) that must accommodate a larger number of interrupt sources. These predetermined interrupt inputs are software programmable with respect to assigned interrupt priority levels. Accordingly, an interrupt multiplexing function is provided between the DMA controller 550 and the CPU 510 to accommodate the larger number of interrupt sources than defined interrupt levels.

The interrupt multiplexing function is preferably embodied as a field programmable gate array (FPGA) device 560 that multiplexes or categorizes the interrupt sources into the various defined interrupt levels. For example, the FPGA 560 accumulates all network I/O related interrupts that occur within the aggregation router 400 and multiplexes them onto a single network I/O interrupt level input line 565 to the CPU 510. The signal transported over the network I/O interrupt level input line 565 is preferably a level sensitive interrupt (LSI) signal that informs the CPU of completion of DMA operations involving the DMA controller. Although the CPU is notified of a network I/O type interrupt, it requires further information to determine which device is the source of the interrupt.

The CPU obtains such further information by retrieving the contents of an interrupt status register (ISR 562) within the FPGA. The ISR stores information (e.g., status bit 564) identifying each interrupt source associated with a particular type of interrupt. That is, each interrupt source that asserts an interrupt has a corresponding asserted status bit 564 within the ISR 562. An interrupt mask register (IMR 568) may also be used with the ISR 562 to accommodate all of the various interrupt types stored within the ISR and isolate those particular types in an efficient manner. Depending upon the type of interrupt and the particular source(s) generating the interrupt, an appropriate interrupt handler process 512 is invoked by the CPU 510 to service the interrupt. Thus, by utilizing two distinct interrupt signal lines, the invention obviates the need for the CPU to read a register internal to the DMA controller, e.g., a DMA ISR 555, to determine the type of interrupt generated by the controller 550. Rather, the CPU can access the ISR 562 (and, if necessary, IMR 568) within the FPGA over a fast device bus 532. Retrieving the contents of the register(s) over the low latency bus 532 represents a performance enhancement/ optimization over retrieving similar information via the slower PCI bus 540.

To facilitate communication between the CPU and DMA controller when exchanging packets, a shared data structure is provided in CPU memory 520 that points to (references) a location in the memory where a packet moved by the controller 550 resides. The shared data structure is preferably a DMA descriptor ring 522 having a plurality of control blocks 524 with pointers 526 that point to (reference) buffers 528 within the CPU memory used to store the packets. Each control block further includes an ownership bit 525 denoting ownership of the control structure by the DMA controller or the CPU.

At initialization, the CPU organizes the control blocks as a descriptor ring, allocates a buffer for each control block, inserts the buffer memory pointer address into the corresponding control block and asserts the ownership bit indicating ownership of the block by either the DMA controller or CPU. When the DMA controller is initialized, it is provided with the location of the DMA descriptor ring in CPU memory. The DMA controller preferably inserts packets into the CPU memory in a defined ordinal manner around the descriptor ring; the CPU then retrieves the packets in that defined order. Alternatively, the DMA controller and CPU may maintain head and tail pointers (not shown) to determine which control blocks should be examined.

Upon moving a data packet into the CPU memory, the DMA controller 550 changes the ownership bit (via a write operation over the PCI bus) to that of the CPU and asserts the to-RP interrupt signal 554 to the FPGA 560. The interrupt signals 554, 556 are typically LSI signals that are translated by the FPGA to the network I/O LSI input provided over line 565 to the CPU 510. In response to the LSI input, the CPU enters the appropriate interrupt handler routine 512 and proceeds to access the ISR register 562 in the FPGA to determine the source(s) of the interrupt. The CPU accesses this register over the fast device bus 532 coupling the system controller 530 to the FPGA 560. Thereafter, the CPU (i.e., interrupt handler 512) searches the DMA descriptor ring 522 for a control block 524 indicating ownership by the CPU.

Preferably, the interrupt handler searches and processes the control blocks 524 in a defined order until either a preset limit is reached or there are no further control blocks is having an asserted CPU ownership bit 525. At this point, the handler 512 instructs the DMA controller 550 to de-assert the LSI interrupt signal. That is, the LSI signal remains asserted until it is acknowledged and cleared by the CPU. A conventional method for acknowledging and clearing the LSI signal involves the CPU issuing a read operation to the DMA controller to retrieve the contents of the DMA ISR 555. However, this read operation takes place over the high latency PCI bus 540 and, as noted, the present invention is directed to reducing that latency. Furthermore, while the read operation is pending over the bus 540, the CPU may stall, waiting for the results of the read operation. By eliminating the read operation over a high latency bus, the present invention further improves the efficiency of the router by enhancing and increasing the performance of the CPU.

According to an aspect of the invention, the two distinct, interrupt signals 554, 556 provided by the DMA controller to the FPGA device eliminate the need for the CPU to issue a read operation over the PCI bus 540 to determine the type of interrupt asserted by the controller 550. However, it is still necessary to acknowledge and clear the LSI interrupt signals generated by the controller. According another aspect of the present invention, pulsed interrupt signals, rather than LSI signals, are provided by the DMA controller 550 to the FPGA 560. That is, the DMA controller asserts an interrupt by "pulsing" an appropriate interrupt signal to the device 560 to thereby obviate the need to acknowledge and clear the interrupt signals via read operations over the high latency PCI bus.

Thus, when issuing an interrupt in response to an event, the DMA controller generates a pulsed interrupt signal that is received by the FPGA 560 and used to assert an appropriate bit 564 within the ISR 562. The asserted bit (i.e., interrupt) is acknowledged and cleared by the CPU when retrieving the contents of the ISR 562 to determine the source(s) of the interrupt. If another pulsed interrupt is issued by the DMA controller prior to the CPU retrieving the ISR contents, the appropriate bit remains asserted until cleared by the CPU. As a result, acknowledging and clearing of the interrupt signal no longer occurs over the high latency PCI bus 540, but rather takes place over the low latency fast device bus 532.

Yet, clearing of an interrupt signal over the bus 532 raises the possibility of missed interrupts given the nature of the pulsed interrupt signals generated by the DMA controller. As noted, after issuing the change of ownership (write) operation over the PCI bus, the DMA controller generates and asserts the interrupt signal. However when the CPU accesses its memory 520 in response to the interrupt, it is possible that the data packet has not yet been written (stored) at the appropriate buffer location. Moreover, the data packet may be stored at the appropriate buffer 528, but the ownership bit 525 may not yet have been updated by the change of ownership operation because it is "stalled" within the queues 536 and 544 along the PCI bus. Since no read operation is needed over the PCI bus 540, there is no means to ensure "flushing" of these write operations that may be pending within the queues. Therefore, a technique is needed to detect if any write operations are still pending before the interrupt handler 512 exits. If a write operation is still pending, a read operation over the PCI bus 540 may be issued to "flush" the queues 536 and 544.

In accordance with another aspect of the present invention, a first counter (e.g., current counter 566) is provided in the FPGA 560 that counts the interrupt pulses generated by the DMA controller 550 as they are received at the device 560. The FPGA preferably maintains a current counter for each interrupt signal 554, 556 and increments that counter every time an interrupt pulse (i.e., an active edge) is detected. The counter 566 "wraps" to an initialized value, e.g., 0, whenever it reaches its maximum value, which is illustratively 16 bits. Note that the status bit 564 for each interrupt is set whenever an interrupt is asserted, i.e., whenever the counter 566 is incremented. The status bit is cleared (and the counter may be reset) whenever it is accessed (read) by, e.g., the CPU. Armed with knowledge of the number of interrupts that have been generated by the DMA controller, the CPU can count the number of control blocks it processes in response to the interrupt signal. If the numbers do not equal, the interrupt handler 512 can continue to search the descriptor ring 522 in CPU memory 520 to determine whether there are additional control blocks 524 that need processing.

According to yet another aspect of the invention, a second counter (e.g., a last counter 514) is provided in the CPU 510 that is incremented in response to each interrupt serviced by the CPU. In other words, after processing each CPU-owned control block 524, the interrupt handler 512 increments the last counter 514. The handler 512 continues processing the control blocks until a preset limit is reached or there are no more CPU-blocks. The interrupt handler then proceeds to read the value of the current counter 566 in the FPGA 560 and compares it with the value of the last counter 514. If the values match, the CPU 510 may exit the interrupt handler routine 512.

However, if the current counter value is greater than the last counter value, the interrupt handler 512 is notified that there are more interrupts to service. Accordingly, the interrupt handler polls the DMA descriptor ring 522 until it discovers an asserted CPU ownership bit 525 in a control block 524. This eliminates the need for a read operation over the high latency PCI bus 540 to flush any pending write operations within the queues coupled to the bus. Of course, in a situation where it is known (based on examination of the counters) that there are pending write operations within the queues 536 and 544, then a read operation can be issued by the CPU to flush those write operations.

Figure 6:
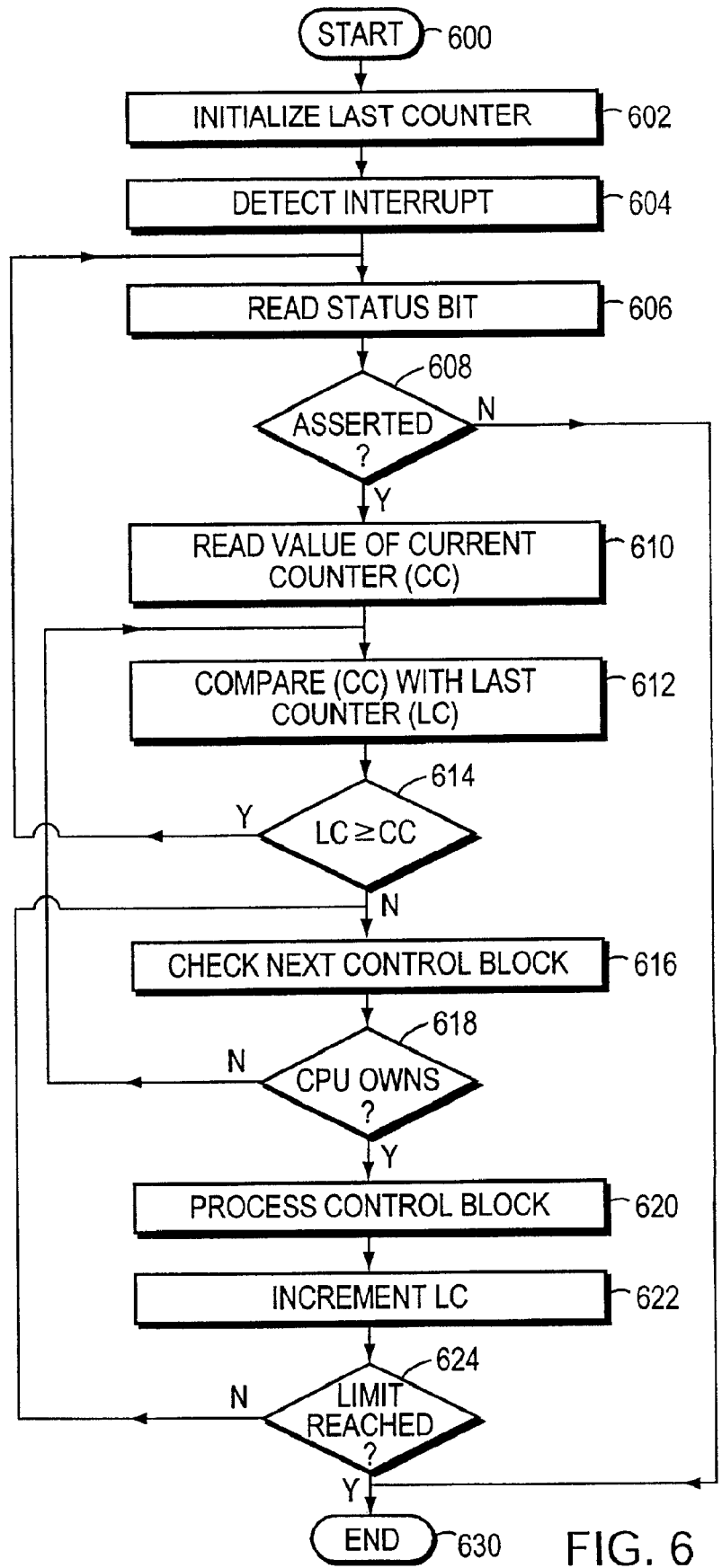
FIG. 6 is a flow chart illustrating a fast acknowledgment sequence in accordance with the present invention.

FIG. 6 is a flow chart depicting an illustrative embodiment of a fast acknowledgment sequence implemented by the interrupt handler 512 when servicing interrupts asserted by the DMA controller. It should be noted that other, generally similar embodiments of the sequence may be implemented by the handler to achieve fast acknowledgement of interrupt sources coupled to a high latency path. The sequence starts at Step 600 and proceeds to Step 602 where, upon system reset or start up, the last counter 514 is initialized to, e.g., zero. At Step 604, an interrupt asserted by the DAN controller is detected. In response, the interrupt handler reads the status bit 564 at Step 606 (which clears that bit) and in Step 608, the handler determines whether the status bit 564 is asserted. If the bit is not asserted, the handler is dismissed and the sequence ends at Step 630.

However, if the status bit is asserted, the interrupt handler reads the value of the current counter 566 in Step 610. In Step 612, the value of the current counter is compared with the value of the last counter 514. If the last counter value is greater than or equal to the current counter value, taking counter wraps into consideration (Step 614), then the sequence returns to Step 606 where the handler reads the status bit and proceeds accordingly. If not, the interrupt handler checks the next control block 524 shared between the CPU and the DMA controller (Step 616). In Step 618, a determination is made whether the CPU owns the control block. That is, an ownership bit 525 of the control block 524 is examined to determine whether the CPU 510 owns the block.

If the CPU does not own the control block 524, the sequence returns to Step 612 where the handler compares the value of the current counter with the value of the last counter 514 and then proceeds accordingly. If the CPU owns the control block, the interrupt handler processes the block in Step 620. In Step 622, the handler increments the last counter 514 for the processed control block, i.e., interrupt, and in Step 624, the handler determines whether a preset limit for processing control blocks has been reached. If not, then the sequence returns to Step 616 where the handler checks the next control block and proceeds accordingly. If the limit is reached in Step 624, then the handler is dismissed and the sequence ends at Step 630.

It should be noted that once the interrupt handler 512 is dismissed (Step 630), it may be immediately invoked again for an interrupt "posted" in the ISR 562, but that is associated with a packet that has already been processed. If the interrupt handler routine is entered again, the ISR 562 is read to clear the pending interrupt and the interrupt handler searches the DMA descriptor ring 522 for control blocks 524 having asserted CPU ownership bits 525. However, if there are no CPU-owned control blocks, the interrupt handler routine has been invoked for no good reason.

Figure 7:
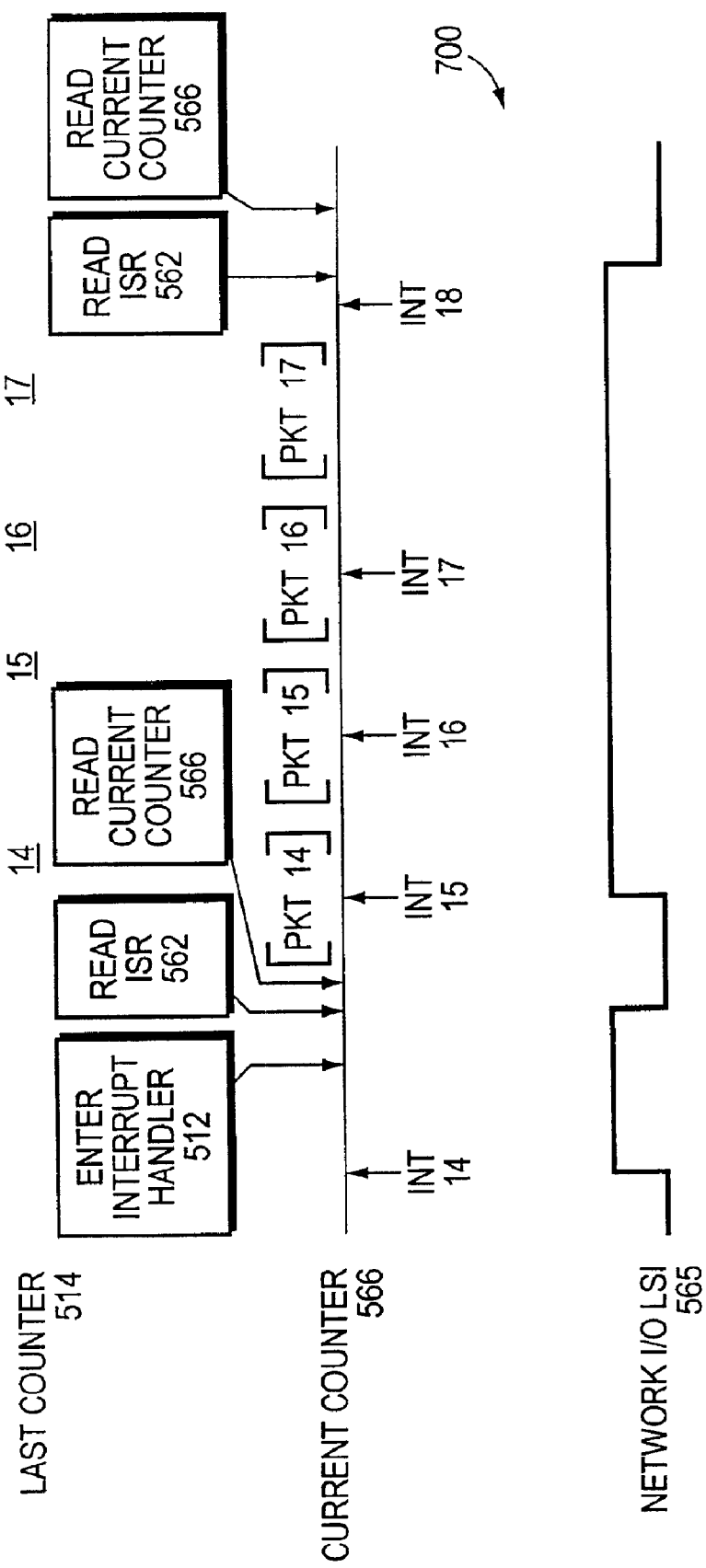
FIG. 7 is a diagram of a time line that illustrates the occurrence of events as a result of interrupts generated by the DMA controller of FIG. 5.

FIG. 7 is a diagram of a time line 700 that illustrates the occurrence of events as a result of interrupts generated by the DMA controller 550. After an interrupt (e.g., INT 14) is counted in current counter 566 of the FPGA 560, the CPU 510 enters the interrupt handler routine 512. Thereafter, the interrupt handler reads the ISR 562 in the FPGA 560 and then reads the current counter 566. Substantially simultaneously with the assertion of another interrupt (e.g., INT 15), the interrupt handler 512 processes a packet (e.g., PKT 14) associated with INT 14 and referenced by control block 524. After processing PKT 14, the interrupt handler searches the DMA descriptor ring 522 for additional control blocks referencing packets (e.g., PKT 15–17) that need processing.

After processing PKT 17 associated with INT 17, the interrupt handler determines there are no additional control blocks or packets to process. During this time, the last counter 514 of the CPU 510 has been incremented for each processed control block and, as a result of processing PKT 17, the last counter realizes a value of 17. Since there are no further control blocks that need processing (according to the DMA descriptor ring), the interrupt handler may be dismissed. Yet if the handler is dismissed at this point, it will be immediately invoked again because the network I/O LSI level input 565 to the CPU has not been de-asserted as a result of a read operation. That is, the CPU entered the handler routine 512 after INT 14 was asserted. The handler then read the ISR 562 to clear the LSI signal associated with that interrupt signal. Yet, when subsequent INT 15–17 were asserted, there was no read of the ISR to clear the LSI input to the CPU. Accordingly, the interrupt signal remained asserted. In order to ensure that the interrupt level input 565 is cleared and acknowledged, the interrupt handler 512 performs another read of the ISR 562.

Assume now that another interrupt (e.g., INT 18) occurs between reading of the current counter 566 and reading of the ISR 562. Although the read of the ISR 562 "turns off" (de-asserts) the network I/O LSI interrupt level input 565 to the CPU, it is possible that the interrupt handler 512 may "miss" INT 18. That is, a "race" condition arises if an interrupt is posted in the ISR 562 prior to a short window in which the network interrupt level input is de-asserted. To avoid this race condition, the interrupt handler performs a second read operation of the current counter 566 in the FPGA 560. Thus, the first read operation of the current counter 566 indicates whether all pending interrupts have been processed by the interrupt handler, whereas the second read operation of that counter avoids a race condition. Accordingly, the interrupt acknowledgement technique may require a plurality of (e.g., 3 or 4) read operations over the low-latency, high-speed device bus 532 between the CPU and FPGA 560 to clear and acknowledge pending interrupts. Nevertheless, this novel technique advantageously eliminates all read operations over the high latency external PCI bus 540, thereby providing a performance enhancement to the aggregation router.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A system configured to acknowledge and service an interrupt issued to a processor of an intermediate node, the system comprising:
    an external device coupled to a high latency path, the external device generating a pulsed interrupt signal for each type of interrupt supported by the processor;
    an interrupt multiplexing device accessible by the processor over a fast bus;
    a low latency path coupling the external device to the interrupt multiplexing device and adapted to transport each pulsed interrupt signal generated by the external device to the interrupt multiplexing device; and
    a status bit stored within the interrupt multiplexing device, the status bit adapted for assertion whenever the pulsed interrupt signal is detected at the interrupt multiplexing device;
    wherein, in response to the pulsed interrupt signal, the interrupt multiplexing device issues a level sensitive interrupt (LSI) signal to the processor over the fast bus, the LSI signal remaining asserted until the interrupt is acknowledged by the processor by clearing the status bit.

2. The system of claim 1 further comprising a current counter associated with the interrupt multiplexing device, the current counter incremented in response to each pulsed interrupt signal at the interrupt multiplexing device.

3. The system of claim 2 further comprising an interrupt handler invoked by the processor to service the issued interrupt.

4. The system of claim 3 further comprising a last counter associated with the processor, the last counter incremented in response to each interrupt serviced by the CPU.

5. The system of claim 4 further comprising means for comparing a value of the last counter with a value of the current counter to determine whether there are more interrupts to service.

6. The system of claim 5 wherein the means for comparing comprises the interrupt handler.

7. The system of claim 1 wherein the external device is a direct memory access controller.

8. The system of claim 1 wherein the low latency path is a printed circuit board trace.

9. The system of claim 1 wherein the high latency path is a peripheral computer interconnect bus.

10. The system of claim 1 wherein the interrupt multiplexing device is a field programmable gate array device.

11. A method for acknowledging and servicing an interrupt issued to a processor of an intermediate node, the method comprising the steps of:

generating a pulsed interrupt signal at an external device coupled to a high latency path;

transporting the pulsed interrupt signal to an interrupt multiplexing device over a low latency path coupling the external device to the interrupt multiplexing device;

asserting a status bit in response to detecting the pulsed interrupt signal at the interrupt multiplexing device;

issuing a level sensitive interrupt (LSI) signal to the processor in response to each pulsed interrupt signal received at the interrupt multiplexing device, the LSI signal remaining asserted until the interrupt is acknowledged by the processor; and invoking an interrupt handler to service the issued interrupt;

acknowledging the interrupt by by clearing the status bit in the interrupt multiplexing device.

12. The method of claim 11 further comprising the steps of:

initializing a last counter; and incrementing the last counter in response to each interrupt serviced.

13. The method of claim 12 further comprising the steps of:

reading the status bit; and if the status bit is clear, dismissing the handler.

14. The method of claim 13 wherein the step of reading further comprises step of clearing the status bit.

15. The method of claim 13 further comprising the steps of:

incrementing a current counter in response to each pulsed interrupt signal at the interrupt multiplexing device;

if the status bit is set, reading a value of the current counter;

comparing the current counter value with a value of the last counter; and if the last counter value is greater than or equal to the current counter value, returning to the step of reading the status bit.

16. The method of claim 15 further comprising the steps of:

if the last counter value is not greater than or equal to the current counter value, checking a control block stored in a memory of the node, the control block shared between the processor and the external device; and determining whether the processor owns the control block.

17. The method of claim 16 further comprising the steps of:

if the processor owns the control block, processing the control block; and incrementing the last counter.

18. The method of claim 17 further comprising the steps of:

determining whether a preset limit for processing control blocks has been reached; and if the preset limit is reached, dismissing the handler.

19. Apparatus for acknowledging and servicing an interrupt issued to a processor of an intermediate node, the apparatus comprising:

means for generating a pulsed interrupt signal at an external device coupled to a high latency path;

means for transporting the pulsed interrupt signal to an interrupt multiplexing device over a low latency path coupling the external device to the interrupt multiplexing device;

means for asserting a status bit in response to detecting the pulsed interrupt signal at the interrupt multiplexing device;

means for issuing a level sensitive interrupt (LSI) signal to the processor in response to each pulsed interrupt signal received at the interrupt multiplexing device, the LSI signal remaining asserted until the interrupt is acknowledged by the processor; and means for invoking an interrupt handler to service the issued interrupt;

means for acknowledging the interrupt by by clearing the status bit in the interrupt multiplexing device.

20. A computer readable medium containing executable program instructions for acknowledging and servicing an interrupt issued to a processor an intermediate node, the executable program instructions comprising program instructions for:

generating a pulsed interrupt signal at an external device coupled to a high latency path;

transporting the pulsed interrupt signal to an interrupt multiplexing device over a low latency path coupling the external device to the interrupt multiplexing device;

asserting a status bit in response to detecting the pulsed interrupt signal at the interrupt multiplexing device;

issuing a level sensitive interrupt (LSI) to the processor in response to each pulsed interrupt signal received at the interrupt multiplexing device, the LSI signal remaining asserted until the interrupt is acknowledged by the processor; and invoking an interrupt handler to service the issued interrupt;

acknowledging the interrupt by by clearing the status bit in the interrupt multiplexing device.

21. Electromagnetic signals propagating on a computer network comprising, the electromagnetic signals carrying instructions for execution on a processor for:

generating a pulsed interrupt signal at an external device coupled to a high latency path;

transporting the pulsed interrupt signal to an interrupt multiplexing device over a low latency path coupling the external device to the interrupt multiplexing device;

asserting a status bit in response to detecting the pulsed interrupt signal at the interrupt multiplexing device;

issuing a level sensitive interrupt (LSI) to the processor in response to each pulsed interrupt signal received at the interrupt multiplexing device, the LSI signal remaining asserted until the interrupt is acknowledged by the processor; and invoking an interrupt handler to service the issued interrupt;

acknowledging the interrupt by by clearing the status bit in the interrupt multiplexing device.

22. A method for acknowledging and servicing an interrupt issued to a processor, the method comprising:

generating a pulsed interrupt signal at an external device;

transporting the pulsed interrupt signal to an interrupt multiplexing device over a first low latency path that couples the external device to the interrupt multiplexing device;

asserting a status bit in the interrupt multiplexing device corresponding to the interrupt in response to detecting the pulsed interrupt signal;

issuing to the processor over a second low latency paths, in response to the pulsed interrupt signal, a level sensitive interrupt (LSI) signal, the LSI signal remaining asserted until the interrupt is acknowledged by the processor;

reading the status bit over the second low latency path by an interrupt handler internal to the processor; and clearing the status bit in response to the reading of the status bit to effectively acknowledge the interrupt.

23. The method of claim 22 further comprising:

checking, by the interrupt handler, ownership of a control block and in response to the processor owning the control block, processing the control block.

24. The method of claim 23 further comprising:

assigning ownership of the control block over a high latency path.

25. The method of claim 23 further comprising:

incrementing a current counter in response to each pulsed interrupt signal received at the interrupt multiplexing device;

incrementing a last counter in response each control block processed by the interrupt handler;

comparing the value of the current counter and the value of the last counter; and if the value of the current counter is greater than the value of the last counter, which thereby indicates the control block corresponding to the interrupt has not yet been processed, continuing to attempt to access and process the control block.

26. The method of claim 25 further comprising:

determining whether a preset limit for processing control blocks has been reached; and if the preset limit is reached, dismissing the interrupt handler.

27. An apparatus for acknowledging and servicing an interrupt issued to a processor, the apparatus comprising:

an external device generating a pulsed interrupt signal;

a first low latency path that couples the external device to an interrupt multiplexing device for transporting the pulsed interrupt signal to the interrupt multiplexing device;

a status bit in the interrupt multiplexing device corresponding to the asserted interrupt and set in response to detecting the pulsed interrupt signal;

a second low latency path for issuing to the processor, in response to the pulsed interrupt signal, a level sensitive interrupt (LSI) signal, the LSI signal remaining asserted until acknowledged by the processor;

an interrupt handler internal to the processor for reading and clearing the status bit over the second low latency path, whereby clearing the status bit effectively acknowledges the interrupt and causes the LSI signal to be deasserted.

28. The apparatus of claim 27 further comprising:

the interrupt handler checks ownership of a control block and, in response to the processor owning the control block, processes the control block.

29. The apparatus of claim 28 further comprising:

a high latency path through which ownership of the control block is assigned.

30. The apparatus of claim 28 further comprising:

a current counter incremented in response to each pulsed interrupt signal received at the interrupt multiplexing device;

a last counter incremented in response to each control block processed by the interrupt handler; and a comparator for comparing the value of the current counter and the value of the last counter and if the value of the current counter is greater than the value of the last counter, which thereby indicates the control block corresponding to the interrupt has not yet been processed.

31. The apparatus of claim 30 further comprising:

circuitry for determining whether a preset limit for processing control blocks has been reached a for dismissing the interrupt handler if the preset limit is reached.

32. An apparatus for acknowledging and servicing an interrupt issued to a processor, the apparatus comprising:

means for generating a pulsed interrupt signal at an external device;

means for transporting the pulsed interrupt signal to an interrupt multiplexing device over a first low latency path that couples the external device to the interrupt multiplexing device;

means for asserting a status bit in the interrupt multiplexing device corresponding to the interrupt in response to detecting the pulsed interrupt signal;

means for issuing to the processor over a second low latency path, in response to the pulsed interrupt signal, a level sensitive interrupt (LSI) signal, the LSI signal remaining asserted until the interrupt is acknowledged by the processor;

means for reading the status bit over the second low latency path by an interrupt handler internal to the processor; and means for clearing the status bit in response to the reading of the status bit to effectively acknowledge the interrupt.

33. A computer readable media comprising, the computer readable media having instructions written thereon for execution on a processor for:

generating a pulsed interrupt signal at an external device;

transporting the pulsed interrupt signal to an interrupt multiplexing device over a first low latency path that couples the external device to the interrupt multiplexing device;

asserting a status bit in the interrupt multiplexing device corresponding to the interrupt in response to detecting the pulsed interrupt signal;

issuing to the processor over a second low latency path, in response to the pulsed interrupt signal, a level sensitive interrupt (LSI) signal, the LSI signal remaining asserted until the interrupt is acknowledged by the processor;

reading the status bit over the second low latency path by an interrupt handler internal to the processor; and clearing the status bit in response to the reading of the status bit to effectively acknowledge the interrupt.

34. Electromagnetic signals propagating on a computer network comprising, the electromagnetic signals carrying instructions for execution on a processor for:

generating a pulsed interrupt signal at an external device;

transporting the pulsed interrupt signal to an interrupt multiplexing device over a first low latency path that couples the external device to the interrupt multiplexing device;

asserting a status bit in the interrupt multiplexing device corresponding to the interrupt in response to detecting the pulsed interrupt signal;

issuing to the processor over a second low latency path, in response to the pulsed interrupt signal, a level sensitive interrupt (LSI) signal, the LSI signal remaining asserted until the interrupt is acknowledged by the processor;

reading the status bit over the second low latency path by an interrupt handler internal to the processor; and clearing the status bit in response to the reading of the status bit to effectively acknowledge the interrupt.

* * * * *